(12) United States Patent
Riazi (10) Patent No.: US 7,553,018 B1
(45) Date of Patent: Jun. 30, 2009

(54) EYEGLASS HOLDER

(76) Inventor: Shirin Riazi, P.O. Box 4777, West Hills, CA (US) 91308

( * ) Notice: Subject to any disclaimer, the term of this patent is extended or adjusted under 35 U.S.C. 154(b) by 322 days.

(21) Appl. No.: 11/323,419

(22) Filed: Dec. 31, 2005

(51) Int. Cl.
G02C 1/00 (2006.01)
A45F 5/02 (2006.01)

(52) U.S. Cl. .......................................... 351/158; 24/3.3

(58) Field of Classification Search ................... 351/41, 351/158; 24/3.3, 3.11, 3.12, 10 R, 338, 332, 24/66.1, 114.6, 303, 3.8
See application file for complete search history.

(56) References Cited

U.S. PATENT DOCUMENTS

| 4,732,465 | A |   | 3/1988 | Field |            |
|-----------|---|---|--------|-------|------------|
| 5,229,796 | A |   | 7/1993 | Nitta |            |
| 5,278,591 | A |   | 1/1994 | Trotter |          |
| 5,860,191 | A | * | 1/1999 | Sieger | ........................... 24/3.3 |
| 5,941,487 | A | * | 8/1999 | Keely | ..................... 248/231.51 |
| 5,956,812 | A | * | 9/1999 | Moennig | ........................ 24/3.3 |
| 6,273,375 | B1 |  | 8/2001 | Knepp et al. |     |
| 6,343,859 | B1 |  | 2/2002 | McCormick |       |
| 6,598,268 | B1 | * | 7/2003 | Zelman | ......................... 24/3.3 |

* cited by examiner

Primary Examiner—Hung X Dang (57) ABSTRACT

This invention is an eyeglass holder attachable to clothing, office and shop equipment, handbags, luggage, vehicles and personal transportation. Cooperating clip arms of three designs—straight, rounded and comb shape—close on or around the desired attach object. Alternately, a magnet can attach the eyeglass holder to a ferrous metallic surface, or an adhesive strip to a surface accepting such strips. A solid rigid loop integral with a clip arm suspends the eyeglasses by one of the temple pieces. With straight and rounded clip arms, a movable slider partition can be placed in the loop for a firmer grip on the temple piece. In addition, a metallic or plastic ornament can be placed next to the loop on a clip arm. This eyeglass holder stores and releases eyeglasses safely and speedily, and can be firmly attached to a variety of objects in an optimal way. It is portable, straightforward to use and attractive.

1 Claim, 17 Drawing Sheets

EYEGLASS HOLDER

CROSS-REFERENCE TO RELATED APPLICATIONS

This application claims the benefit of Disclosure Document No. 55144 filed Jun. 9, 2004.

BACKGROUND OF INVENTION

1. Field of Invention

This invention relates generally to holders for eye-glasses. It particularly relates to eyeglass holders attachable to garments, purses, briefcases, luggage and personal transportation.

2. Discussion of Related Art

A patent search was undertaken in which the following patents were found:

U.S. Pat. No. 4,732,465 to Field (1988)
U.S. Pat. No. 5,229,796 to Nitta (1993)
U.S. Pat. No. 5,278,591 to Trotter (1994)
U.S. Pat. No. 5,956,812 to Moennig (1999)
U.S. Pat. No. 6,273,375 to Knepp et al (2001)
U.S. Pat. No. 6,343,859 to McCormick (2002)

These patents describe: devices attached to a temple piece ('859, '465); a loop and alligator clip holder ('812); remote mounting by a tether line ('591); a second structural set of eyeglasses as protection for the correcting eyeglasses ('796); and a spectacles mounting and display card ('375).

The eyeglass holder according to '812 is made of flexible cord which could be damaged or broken if subjected to an impulsive load. The present invention was geared toward a solid and also attractive eyeglass holder capable of resisting such loads.

SUMMARY OF THE INVENTION

The eyeglass holder of this invention comprises upper and lower clip arms joined by a spring hinge and is attachable to clothing, office and shop equipment, handbags, briefcases, vehicles and personal transportation such as bicycles, walkers and wheelchairs.

Normally, the spring hinge keeps the clip arms closed. When the clip arms are to be attached to an object, the user spreads the clip arms by pressing together an upper and a lower lever to open the clip arms against the spring force.

A loop made of solid material is firmly attached to the upper clip arm for suspending a pair of eyeglasses by a temple piece. The invention comes with three clip arm designs:

- Straight with interior gripping surfaces—for attaching to flat fabrics, leather and plastics;
- Rounded with a closing clasp—for attaching to thicker objects like straps on handbags and backpacks; and
- Comb shape with interlocking teeth—for attaching completely around cylindrical objects like handbag and luggage handles and bars on bicycles, walkers and wheelchairs and other personal transportation means.

Further, a magnet with a flat outer surface can be secured to the outer surface of any lower clip arm for attaching to a flat ferrous metallic surface. The magnet is replaced by an adhesive strip for attaching to a flat non-metallic surface.

In all cases the solid and rigid loop can be located parallel to or perpendicular to the clips. With the straight and rounded clips, the loop can also be located at 45 degrees to the clips. With straight and rounded clip arms the loop is closed or four-sided. It can accommodate a movable slider partition to grip the temple piece. For the comb shape the loop is open or 3-sided and cannot include a slider.

In addition, a metallic or plastic ornament can be placed at the end of an upper arm clip; typically a logo, birthstone, flower, sports symbol, or miniature car, boat, or plane. The components of the eyeglass holder can be made of metal or plastic of any desired color.

The designs of the invention permit the eyeglass holder to be attached to a variety of objects in an optimal way. The advantages include portability, ease of use and an attractive appearance.

BRIEF DESCRIPTION OF THE SEVERAL VIEWS OF THE DRAWING AND DETAILED DESCRIPTION OF THE INVENTION

A better understanding of the invention may be gained by Reference to the Detailed Description which follows, in conjunction with FIGS. 1 through 50 which show the various designs and components of the invention and an application. In the drawing the straight clip arm design is depicted in FIGS. 1-20, the rounded clip arm design in FIGS. 21-40, and the comb shape design in FIGS. 41-50. In all Figures the assembled invention is denoted by numeral 10.

FIGS. 1-6 show the straight design with closed loop 12 parallel to the clip.

Figure 1:
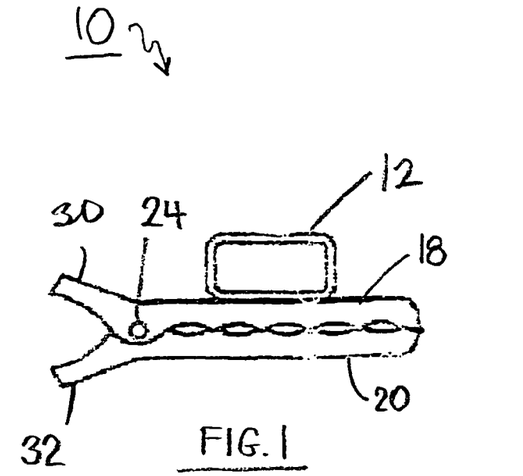
Figure 2:
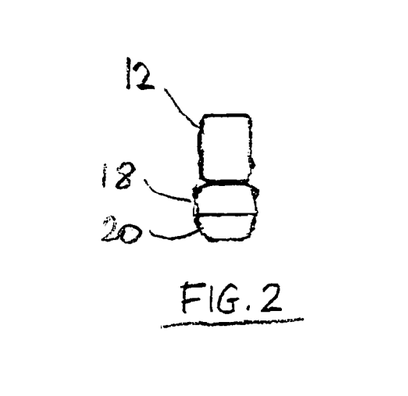

FIG. 1 is a side view with upper clip arm 18 and lower clip arm 20 closed. Top lever 30 and bottom lever with clip arms 18 and 20 open by closing top and bottom levers 30 and 32. Gripping surfaces 34 are shown on the inside of clip arms 18 and 20. Other components are as in FIG. 1.

Figure 4:
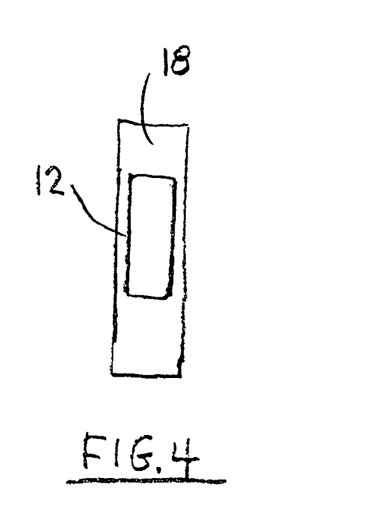

Now FIG. 4 is a top view, looking down on upper clip arm 18 and parallel closed loop 12.

Figure 3:
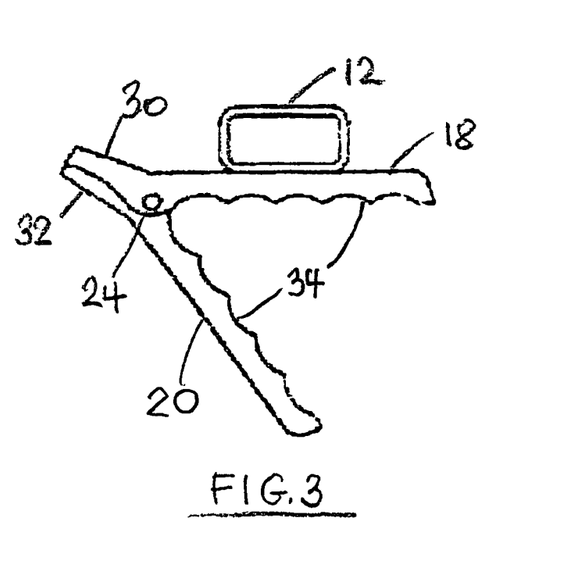
Figure 5:
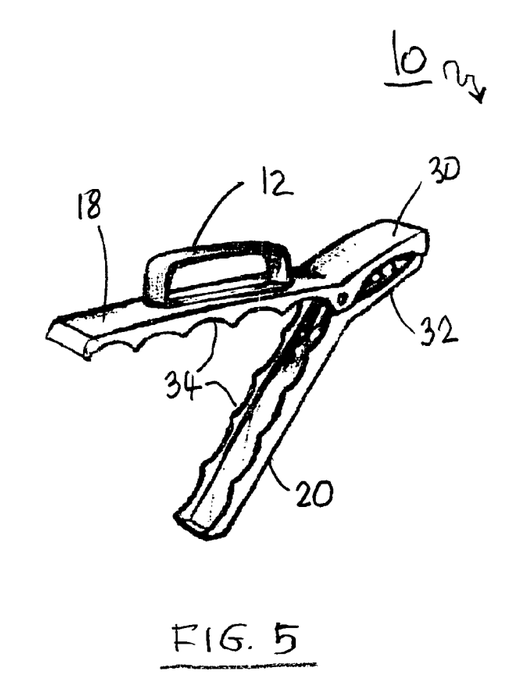

FIG. 5 is a pictorial view with clip arms open, corresponding to FIG. 3.

Figure 6:
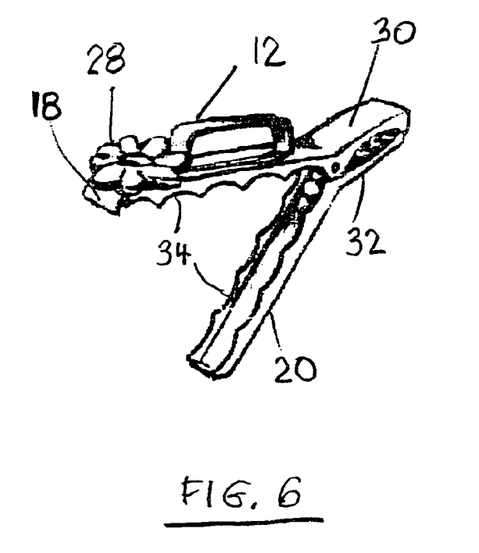

Now FIG. 6 is identical with FIG. 5, except that ornament 28 has been added at the tip of upper clip arm 18.

FIGS. 7-12 show the straight design with a magnet 26 or adhesive strip 42 attached to lower clip arm 20; and with closed loop 12 perpendicular to the clip arms, centered on upper clip arm 18.

Figure 7:
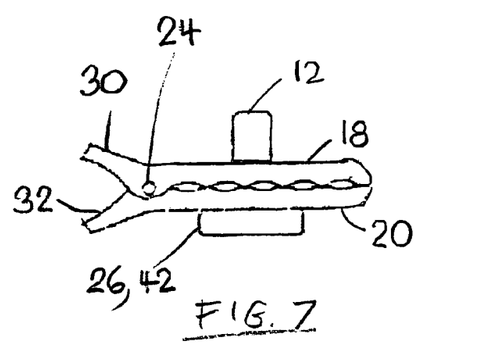

FIG. 7 is a side view with the clip arms closed, and

Figure 8:
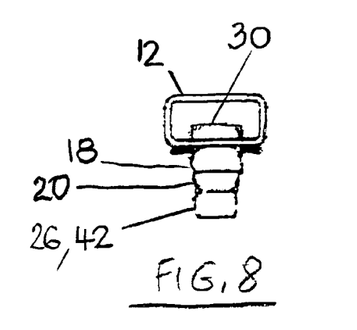

FIG. 8 is the corresponding end view.

Figure 9:
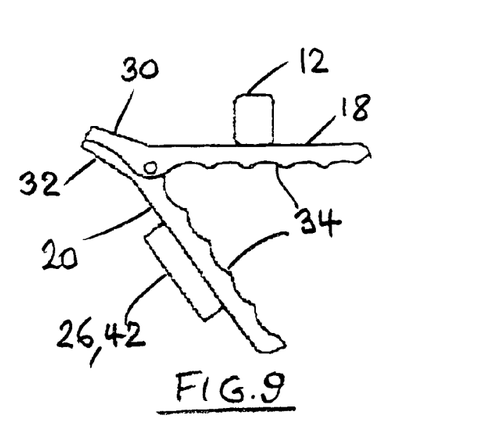

FIG. 9 is a side view with the clip arms open, showing gripping surfaces 34.

Figure 10:
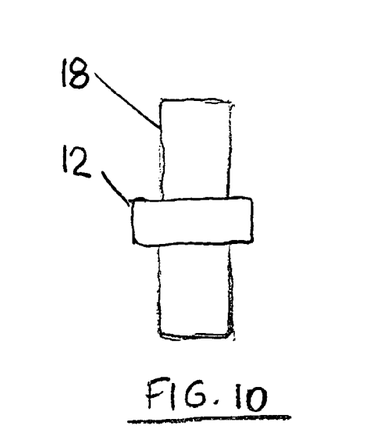

FIG. 10 is a top view showing upper clip arm 18 and perpendicular closed loop 12.

Figure 11:
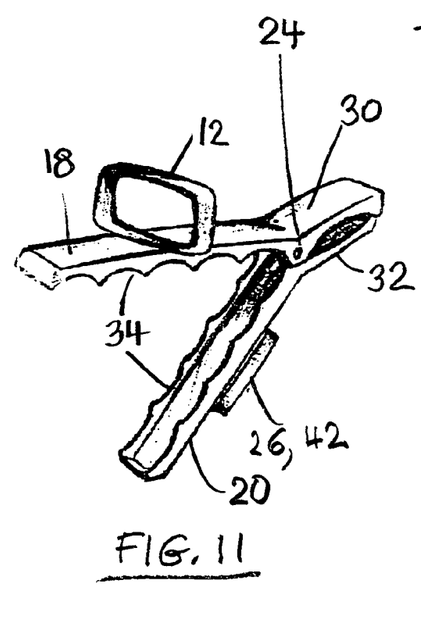

FIG. 11 is a pictorial view corresponding to FIG. 9 and

Figure 12:
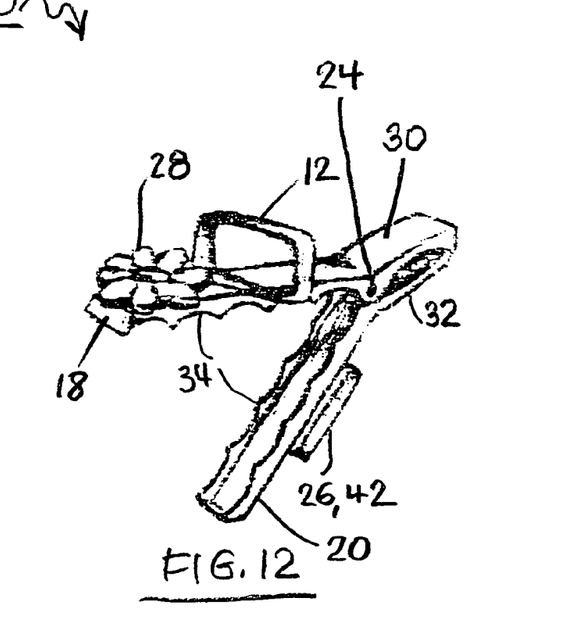

FIG. 12 is like FIG. 11 except that ornament 28 has been added at the tip of upper clip arm 18.

FIGS. 13-18 show closed loop 12 at 45 degrees to clip arms 18 and 20.

Figure 13:
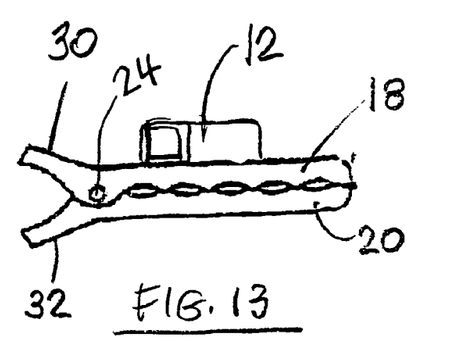

FIG. 13 is a side view with closed clip arms 18 and 20.

Figure 14:
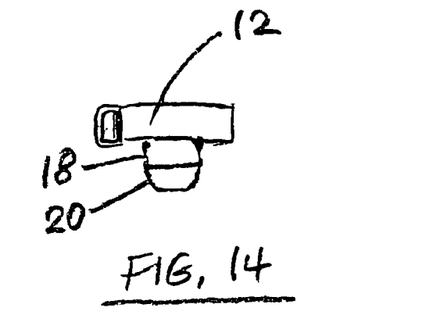

FIG. 14 is an end view corresponding to FIG. 13.

Figure 15:
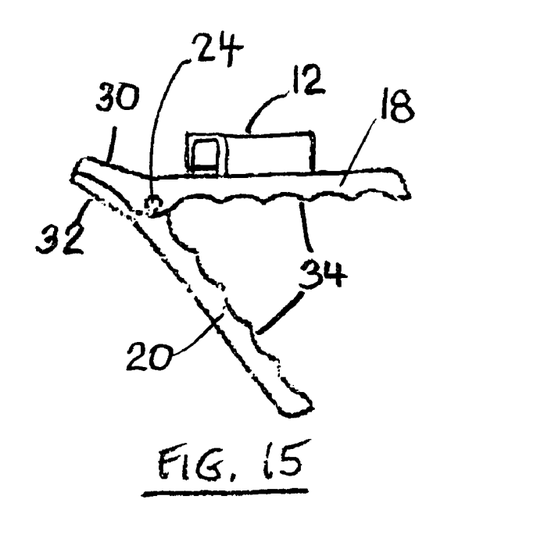

Now FIG. 15 is a side view with open clip arms 18 and 20.

Figure 16:
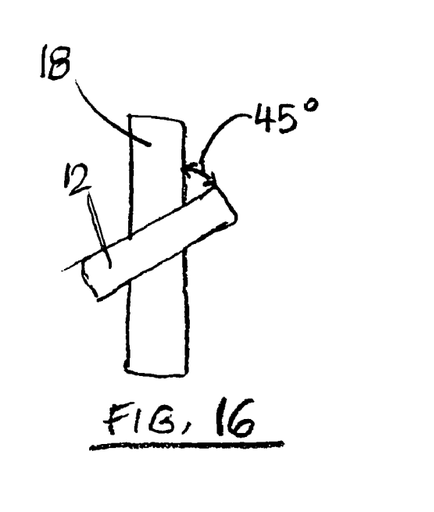

FIG. 16 is a top view showing closed loop 12 at 45 degrees to upper clip arm 18.

Figure 17:
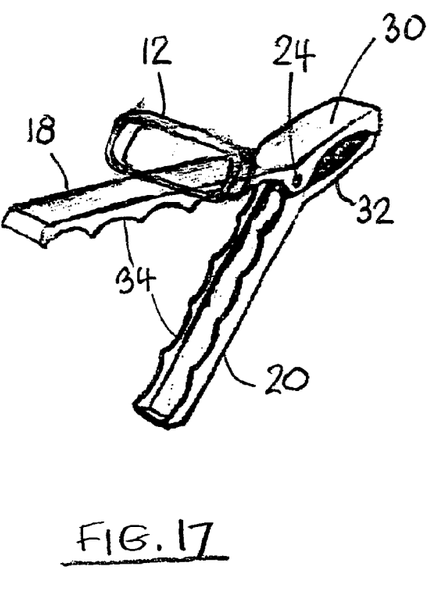
Figure 18:
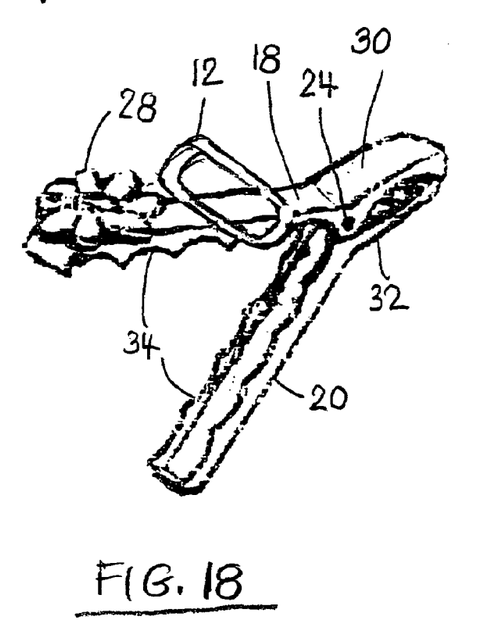

FIG. 17 is a pictorial view corresponding to side view FIG. 15, and FIG. 18 is like FIG. 17 but with ornament 28 added.

Figure 19:
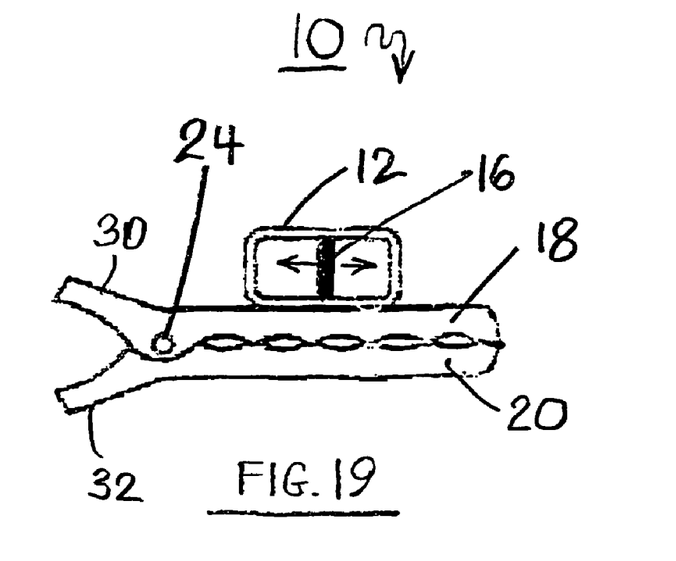
Figure 20:
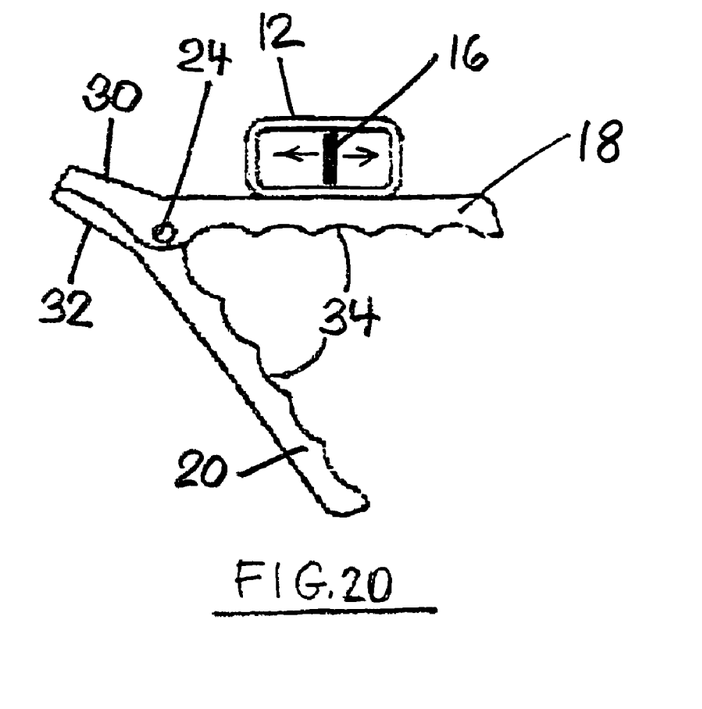

A movable slider partition 16 inside closed loop 12 is shown in FIG. 19 which is otherwise the same as FIG. 1, and in FIG. 20 which is otherwise the same as FIG. 3.

FIGS. 21-26 show the upper rounded clip arm 36 with closing clasp 22, and lower rounded clip arm 38, with parallel loop 12 and magnet 26.

Figure 21:
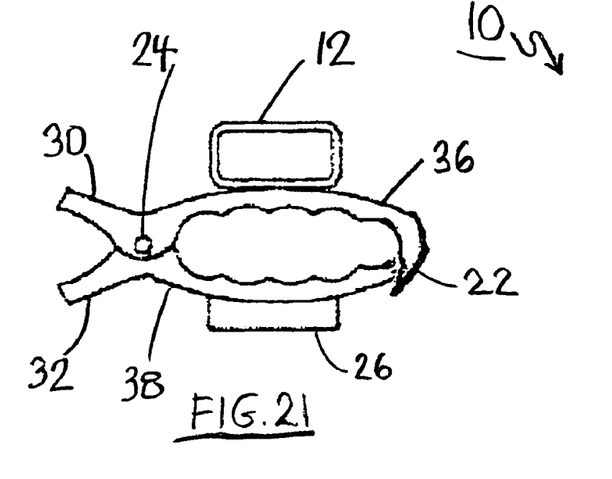

FIG. 21 is a side view with the clip arms closed, also showing spring hinge 24 and top and bottom levers 30 and 32.

Figure 22:
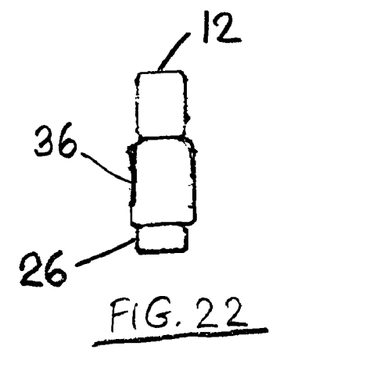

FIG. 22 is an end view corresponding to FIG. 21.

Figure 23:
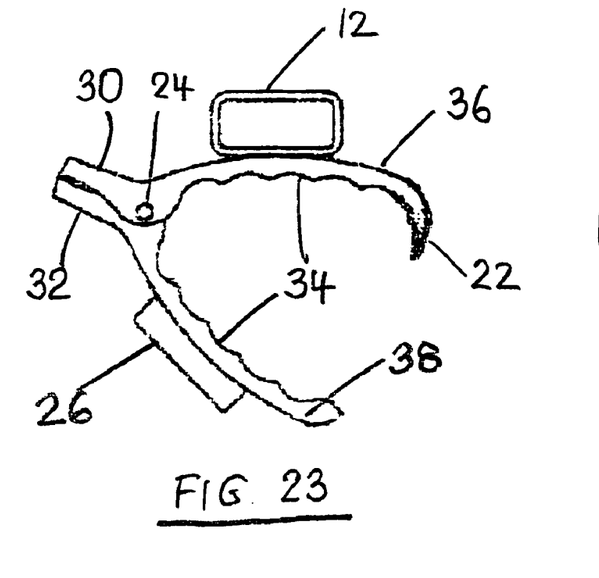

Now FIG. 23 is a side view showing levers 30 and 32 compressed to open rounded clip arms 36 and 38, with internal gripping surfaces 34.

Figure 24:
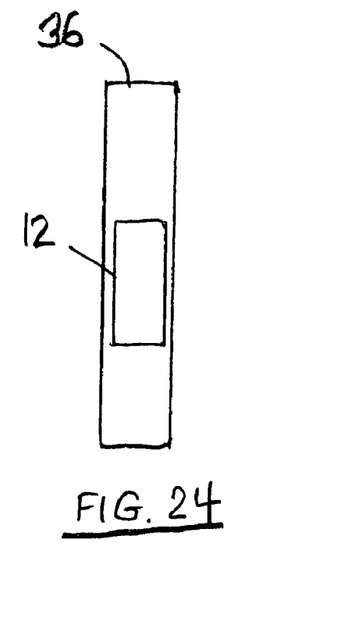

FIG. 24 is a top view showing parallel closed loop 12 and upper rounded clip arm 36.

Figure 25:
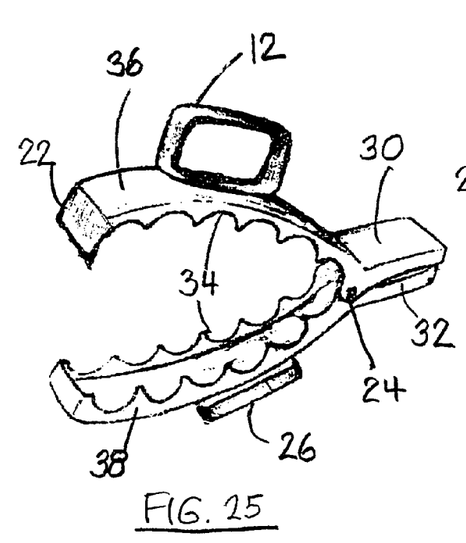

FIG. 25 is a pictorial view corresponding to the side view of FIG. 23, and

Figure 26:
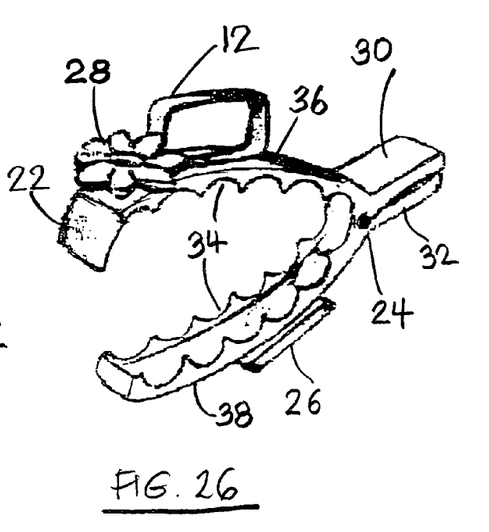

FIG. 26 is like FIG. 25, with added ornament 28.

FIGS. 27-32 are analogous to FIGS. 21-26, except that closed loop 12 is now perpendicular to rounded clip arms 36 and 38.

Figure 27:
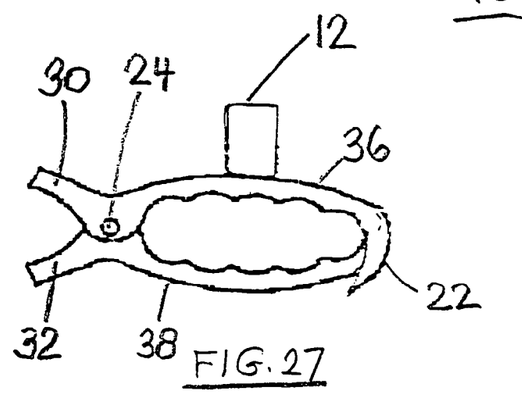

FIG. 27 is a side view with the clip arms closed.

Figure 28:
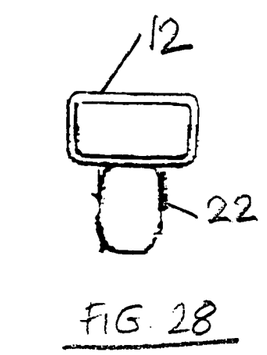

FIG. 28 is an end view corresponding to FIG. 27.

Figure 29:
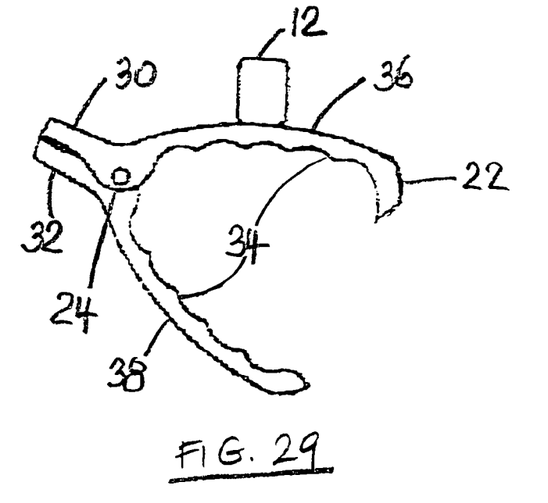

Now FIG. 29 is a side view with clip arms 36 and 38 open, and

Figure 30:
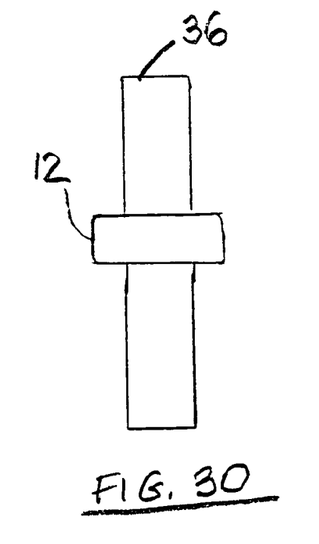

FIG. 30 is a top view showing closed loop 12 perpendicular to rounded upper clip arm 36.

Figure 31:
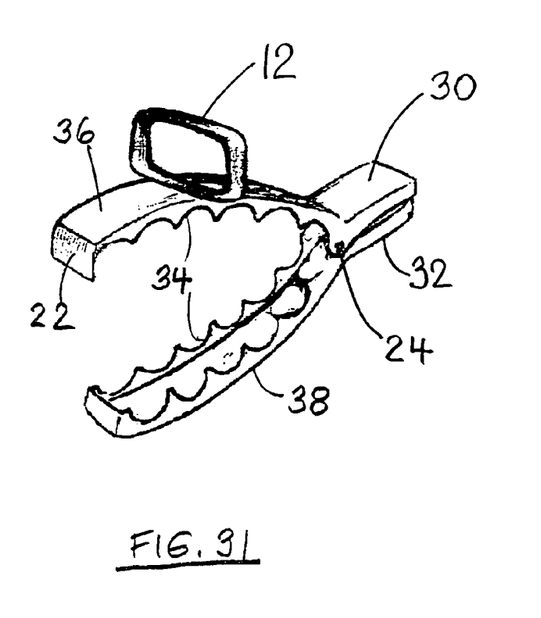

FIG. 31 is a pictorial view corresponding to the side view of FIG. 29, and

Figure 32:
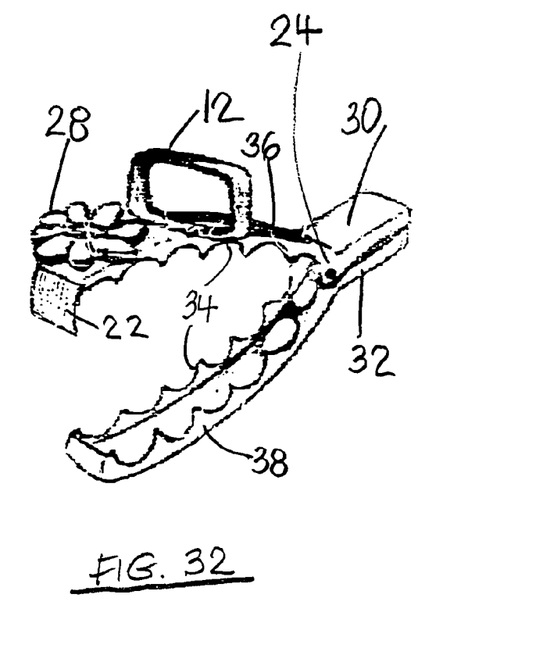

FIG. 32 is like FIG. 31, with ornament 28 added.

FIGS. 33-38 are analogous to FIGS. 21-26 (parallel closed loop) and FIGS. 27-32 (perpendicular closed loop), except that closed loop 12 is now at 45 degrees to rounded clip arms 36 and 38.

Figure 33:
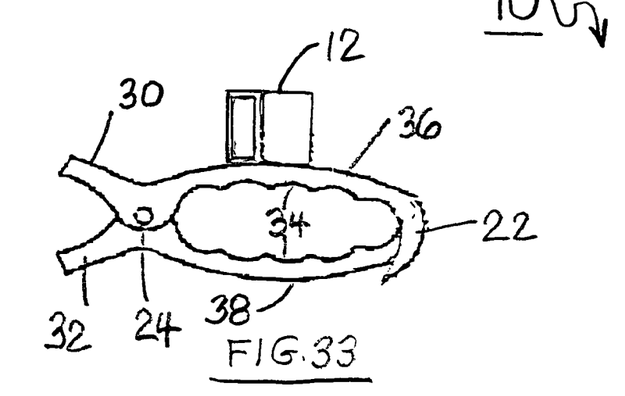

FIG. 33 is a side view with rounded clip arms 36 and 38 closed.

Figure 34:
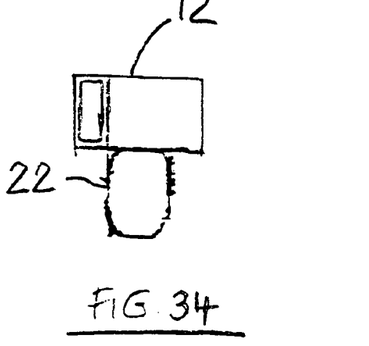

FIG. 34 is an end view corresponding to the side view of FIG. 33.

Figure 35:
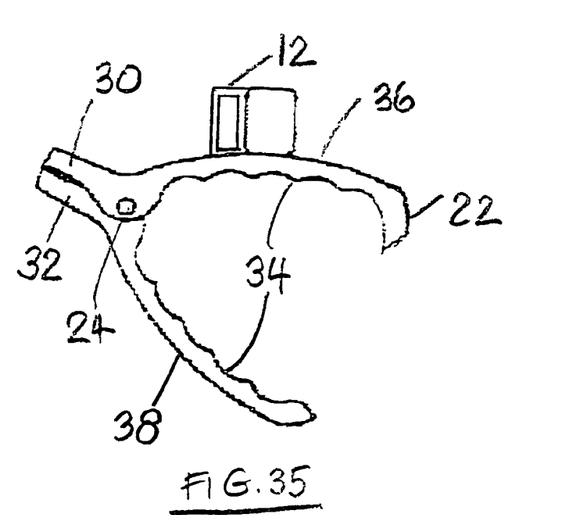

Now FIG. 35 is a side view with clip arms 36 and 38 open, and

Figure 36:
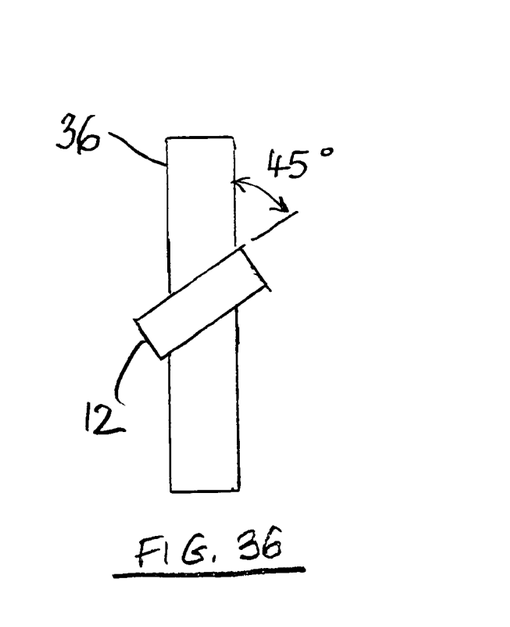

FIG. 36 is a top view showing the 45 degree angle made by closed loop 12.

Figure 37:
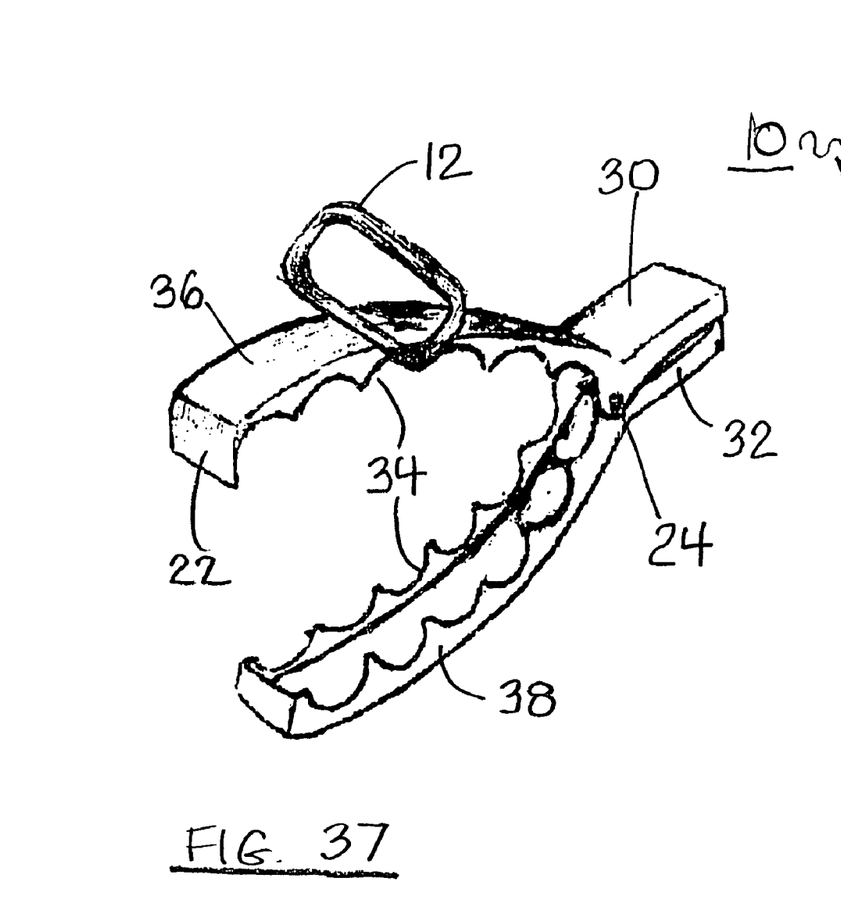

FIG. 37 is a pictorial view corresponding to side view of FIG. 35, with clip arms 36 and 38 open.

Figure 38:
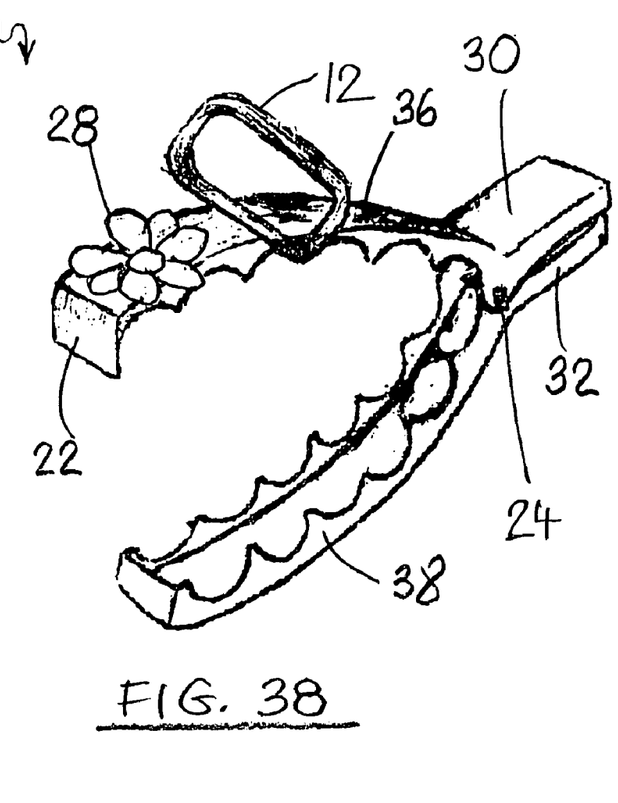

FIG. 38 is like FIG. 37 except that ornament 28 is added.

Figure 39:
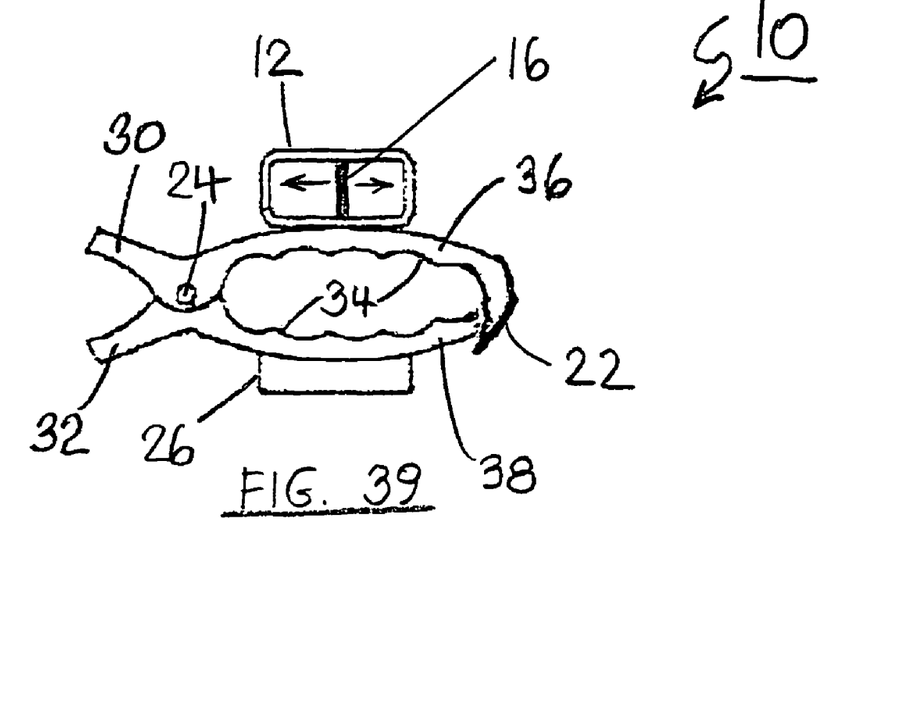
Figure 40:
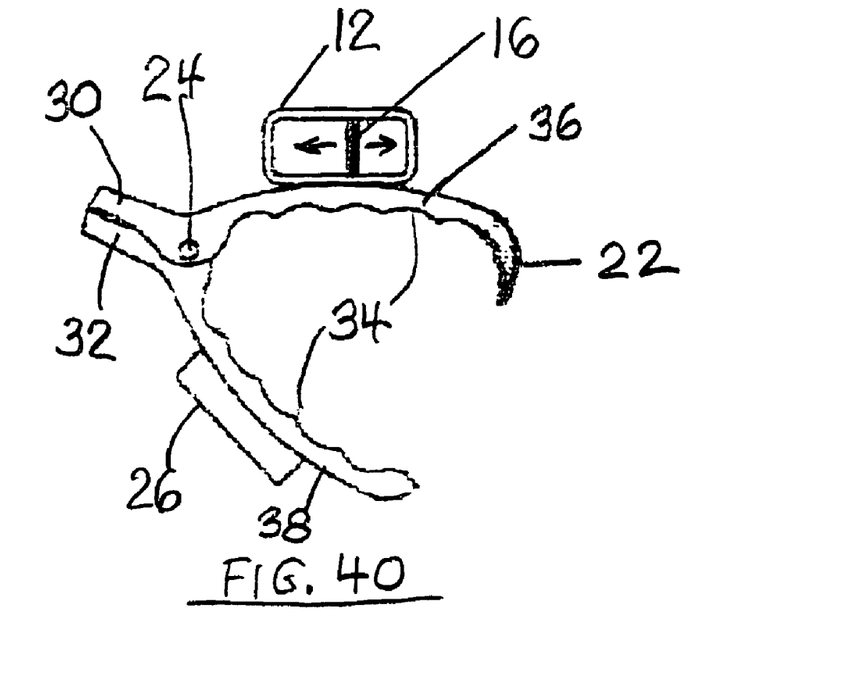

A movable slider partition 16 inside closed loop 12 is shown in FIG. 39 which is otherwise the same as FIG. 21, and in FIG. 40 which is otherwise the same as FIG. 23.

FIGS. 41-44 show the comb shape clip arm design, with open loop 14 parallel to upper comb clip arm 40 and lower comb clip arm 44. Also shown are spring hinge 24, top lever 30, and bottom lever 32.

Figures 41, 42:
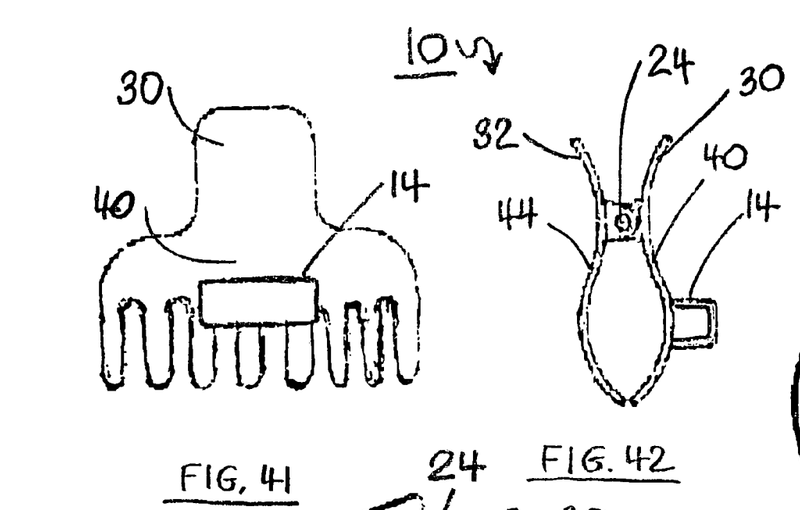

FIG. 41 is a side view with clip arms 40 and 44 closed.

FIG. 42 is the end view corresponding to FIG. 41, and

Figure 43:
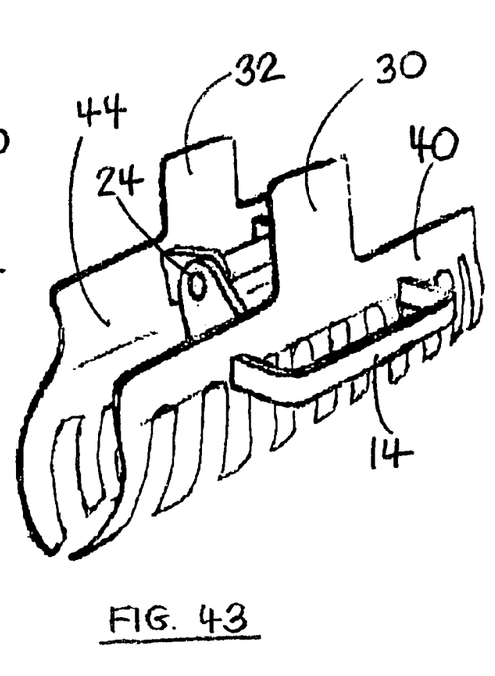

FIG. 43 is a pictorial view corresponding to the side view Of FIG. 41.

Figure 44:
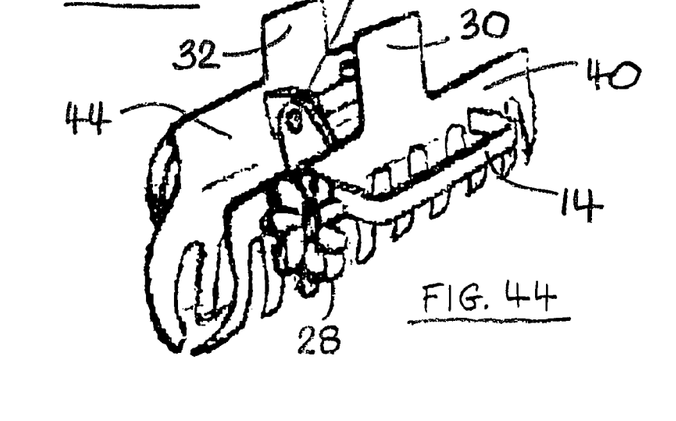

Now FIG. 44 is the same as FIG. 43, with ornament 28 added, affixed to upper comb clip arm 40.

Figure 45:
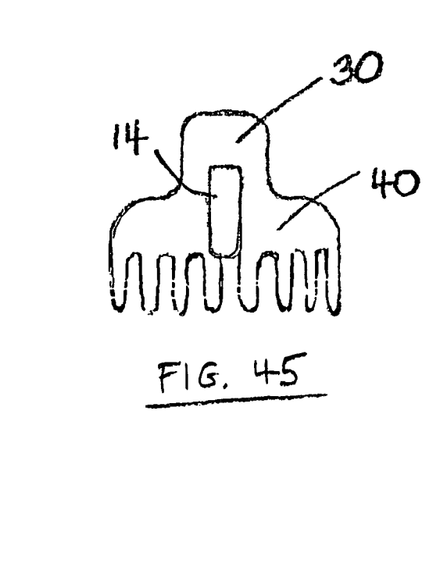
Figure 46:
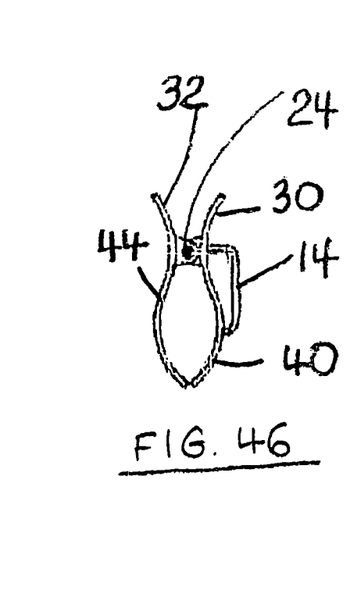
Figure 47:
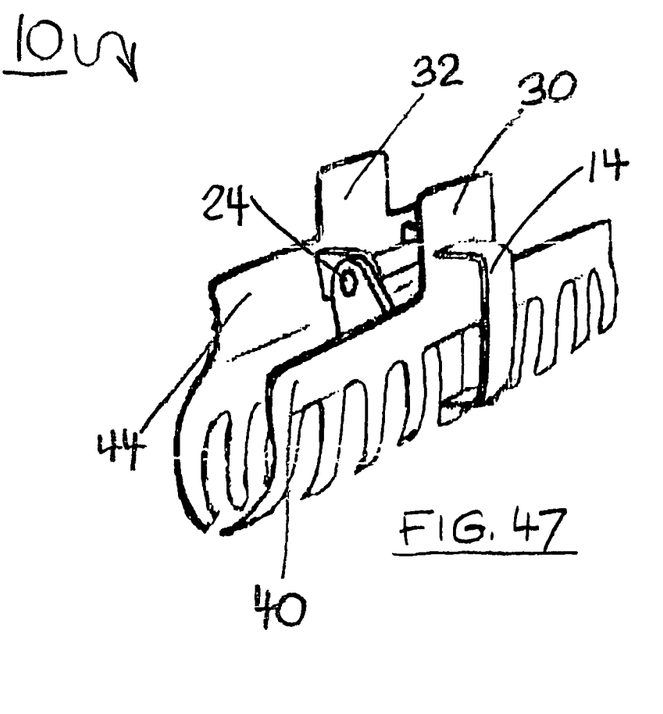

FIGS. 45-47 show open loop 14 perpendicular to comb clip arms 40 and 44.

FIG. 45 is a side view with clip arms 40 and 44 closed.

FIG. 46 is an end view corresponding to FIG. 45, and

FIG. 47 is a pictorial view corresponding to the side view of FIG. 45.

Figure 48:
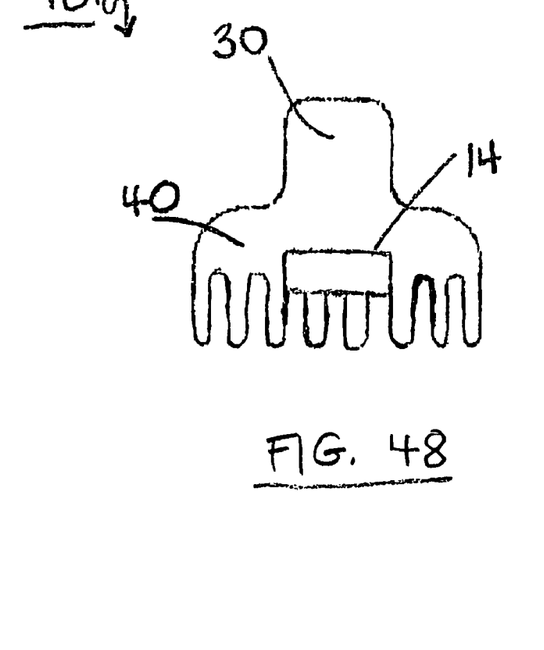
Figure 49:
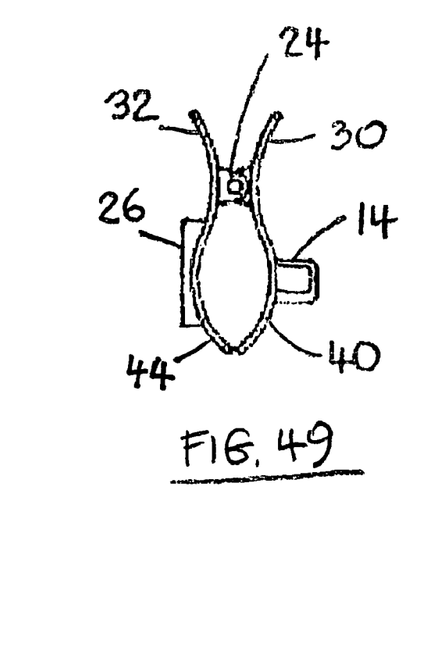

FIGS. 48-49 show magnet 26 added to FIGS. 41-42 which show open loop 14 parallel to comb clip arms 40 and 44.

Figure 50:
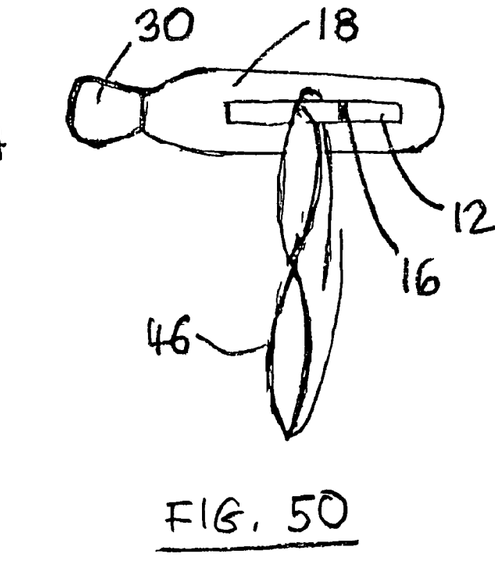

FIG. 50 shows eyeglasses 46 carried in a closed loop 12, with slider partition 16, affixed parallel to straight upper clip arm 18.

OPERATION OF INVENTION

For all designs—Straight, Rounded and Comb shape—the procedure is the same: press together top lever 30 and bottom lever 32, which will separate upper clip arm (18, 36, 40) from lower clip arm (20, 38, 44). Still keeping levers 30 and 32 depressed, place the clip arm aperture around the desired attach object. When in place, release the levers (30,32), allowing the clip arms (18-20,36-38, 40-44) to close on or around the desired object and so attach the eyeglass holder.

Now the free end of an eyeglass temple piece is inserted from above into closed loop 12 or open loop 14 all the way until the other end of the temple piece is adjacent to loop 12 or 14, with the rest of the eyeglasses connected to it.

If a movable slider partition 16 is provided, this can be slid inside closed loop 12 toward the inserted temple piece to secure it in place. The weight of the eyeglasses now keeps them secure in the eyeglass holder of the invention.

If the eyeglasses are to be attached to a plane ferrous metallic surface, a magnet 26 (as shown in FIGS. 21-26, 39-40 and 48-49) can be provided for a magnetic attachment of the eyeglass holder in place of the attachment by clip arms. Similarly, adhesive strip 42 (in place of magnet 26) can secure the eyeglass holder to a surface which can accept adhesive strips.

To extract the eyeglasses from the holder, slider 16 (if provided) is slid away from the temple piece in loop 12, and then the temple piece and connected eyeglasses are lifted out of loop 12. Later the eyeglass holder may be removed from its attach object by depressing levers 30 and 32 to open the clip arm aperture, or by detaching magnet 26, or by peeling off adhesive strip 42, depending on the attach method used.

The designs of the invention provide an eyeglass holder with secure attachment (and subsequent detachment) means to a variety of attach objects. The advantages include portability, ease of use and an attractive appearance.

It is to be understood that the invention may be realized with embodiments differing from the specific devices disclosed herein without departing from the scope of the present invention as delineated in the following claims.

I claim:

1. An eyeglass holder for holding a pair of eyeglasses, said eyeglass holder being attachable to external objects and comprising
   a straight upper clip arm with interior gripping surfaces;
   a top lever joined to said upper clip arm at a junction point, together forming an upper crank;
   a straight lower clip arm with interior gripping surfaces;
   a bottom lever joined to said lower clip arm at a junction point, together forming a lower crank;
   a spring hinge bringing together said upper crank and said lower crank coaxially at said junction points, with a spring force keeping said upper clip arm and said lower clip arm closed against each other;
   a closed loop attached to said upper clip arm for holding a temple piece of said pair of eye glasses; and
   a movable slider partition within said closed loop;
   whereby by pressing together said top lever and said bottom lever said spring force is counteracted to form a clip arm aperture for subsequent closing on or around a said external object to attach said eyeglass holder with said pair of eyeglasses to a said external object.

* * * * *